United States Patent [19]
Iwata

[11] Patent Number: 4,467,973
[45] Date of Patent: Aug. 28, 1984

[54] AUTOMATIC INSULATING TAPE WRAPPING APPARATUS

[75] Inventor: Kazutoshi Iwata, Yokohama, Japan

[73] Assignee: Tokyo Shibaura Denki Kabushiki Kaisha, Kawasaki, Japan

[21] Appl. No.: 395,749

[22] Filed: Jul. 6, 1982

[30] Foreign Application Priority Data

Jul. 15, 1981 [JP] Japan .................. 56-110248

[51] Int. Cl.³ .................................. B65H 81/08
[52] U.S. Cl. ............................ 242/7.08; 156/425
[58] Field of Search ........... 242/6, 7.08, 7.15, 7.16, 242/7.21, 7.22, 7.23; 29/605; 156/425, 428, 443, 189, 361, 363, 433, 195, 350, 351

[56] References Cited

U.S. PATENT DOCUMENTS

| | | | |
|---|---|---|---|
| 2,367,086 | 1/1945 | Barry | 242/6 |
| 2,962,236 | 11/1960 | Foley, Jr. et al. | 242/6 |
| 4,076,055 | 2/1978 | Zolman et al. | 242/7.15 X |
| 4,249,704 | 2/1981 | Sakaue et al. | 242/7.23 |

FOREIGN PATENT DOCUMENTS 54-142340 11/1979 Japan.
55-16853 2/1980 Japan.

Primary Examiner—Stuart S. Levy
Assistant Examiner—David Werner
Attorney, Agent, or Firm—Stevens, Davis, Miller & Mosher

[57] ABSTRACT

In apparatus for wrapping an insulating tape about an electric coil including a straight portion and a curved portion, movements of a head carrying a coil of the insulating tape along the electric coil, rotation of the head about the electric coil, and swinging of the head are effected by independent electric motors. Pulses representing the speeds of respective motors are inputted into a microcomputer which supplies speed instructions to the motors to rotate them at speeds suitable for sections of the electric coil having different shapes, thus synchronously operating the motors.

7 Claims, 7 Drawing Figures

AUTOMATIC INSULATING TAPE WRAPPING APPARATUS

BACKGROUND OF THE INVENTION

This invention relates to an automatic insulating tape wrapping apparatus, and more particularly an automatic insulating tape wrapping apparatus suitable to wrap an insulating tape about a conductor coil including a straight portion and a curved portion as shown in FIG. 1, for example.

When wrapping an insulating tape about a relatively small hexagonal coil 1 as shown in FIG. 1 of a dynamoelectric machine, the coil 1 and a head carrying a rotating ring paying out the tape are moved relatively. Since the size of the coil is small it is necessary to increase the operating speed of the tape wrapping apparatus. Otherwise, the advantage of using the automatic wrapping apparatus would be lost. With a manual wrapping operation, the straight portion of a relatively small hexagonal coil of a dynamoelectric machine can be wrapped with an insulating tape at a speed of 50 mm/sec. or more.

Considering a central straight portion 1a, bent or curved portions 1b and 1c, inclined end portions 1d and 1e (excluding their extremities), as these portions lie in the same plane, wrapping operation is relatively easy. However, wrapping of bent or curved portions 1b and 1c is rather difficult. For the purpose of wrapping the tape about the curved portions at substantially the same accuracy as manual working, according to a prior art apparatus each one of the curved portions was divided into at least more than 10 sections to such an extent that each section can be deemed at a straight section. Alternatively, the rotating angle of the rotating ring is detected frequently so as to control the speed of the rotating ring in accordance with the detected rotation angle with a computer. Accordingly, it is necessary to use a computer having a large memory capacity and a high calculation speed and to use a high speed and accurate detector and control device.

In the operation of automatic insulating tape wrapping apparatus, it was found that in order to improve the accuracy it is necessary to synchronously operate a drive device for rotating the rotating ring and a drive device for displacing the rotating ring and for changing the angle of rotation thereof.

SUMMARY OF THE INVENTION

Accordingly, it is an object of this invention to provide an improved automatic insulating tape wrapping apparatus capable of accurately wrapping at a high speed the insulating tape about an electric coil including straight and curved portions.

Another object of this invention is to provide an improved automatic insulating tape wrapping apparatus capable of synchronously operating a drive device for rotating the rotating ring and a drive device for displacing the rotating ring and for changing the angle of rotation thereof.

According to this invention, there is provided an automatic insulating tape wrapping apparatus about an electric coil dividable into a plurality of sections and including a curved portion, comprising a tape wrapping head including a rotating ring carrying the insulating tape, first drive means for rotating the head about the coil, second drive means for moving straightly the head along the coil, third drive means for swinging the head about an axis perpendicular to a straight movement of the head and arithmetic operation means for driving the second drive means at predetermined speeds in respective sections and for driving the third drive means for swinging the head at a predetermined speed and for a predetermined angle.

DESCRIPTION OF THE PREFERRED EMBODIMENTS

Figure 2:
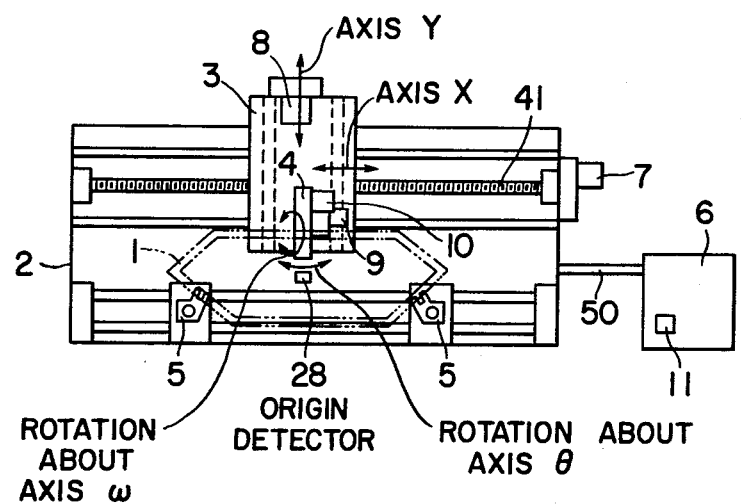
FIG. 2 is a plan view showing one embodiment of the automatic insulating tape wrapping apparatus according to this invention.

A preferred embodiment of the automatic insulating tape wrapping apparatus shown in FIG. 2 comprises a table 3 movable in the X and Y axis directions of rectangular coordinates on a bed 2, a taping or wrapping head 4 swingable about an axis $\theta$ perpendicular to the surface of the table 3, the head including a ring, not shown, rotatable about an axis $\omega$ perpendicular to the axis $\theta$ and carrying a coil of an insulating tape on one side of the ring, a pair of electric coil holding members 5 mounted on the positions of the bed 2 which do not interfere with movement of the table 3 in the direction of axis X, and a control board 6 including an operating panel provided with a keyboard 11 and located near the bed 2. The table 3 is moved in the direction of the axis X by a DC motor 7 through a lead screw 41. Table 3 is moved in the direction of axis Y by a DC motor 8. The head 4 is swung about the axis $\theta$ by a DC motor 9 and the head 4 is rotated about the axis $\omega$ by a DC motor 10. The speeds of the DC motors are controlled by the signals from the control pannel 6 through a cable 50.

Figure 3:
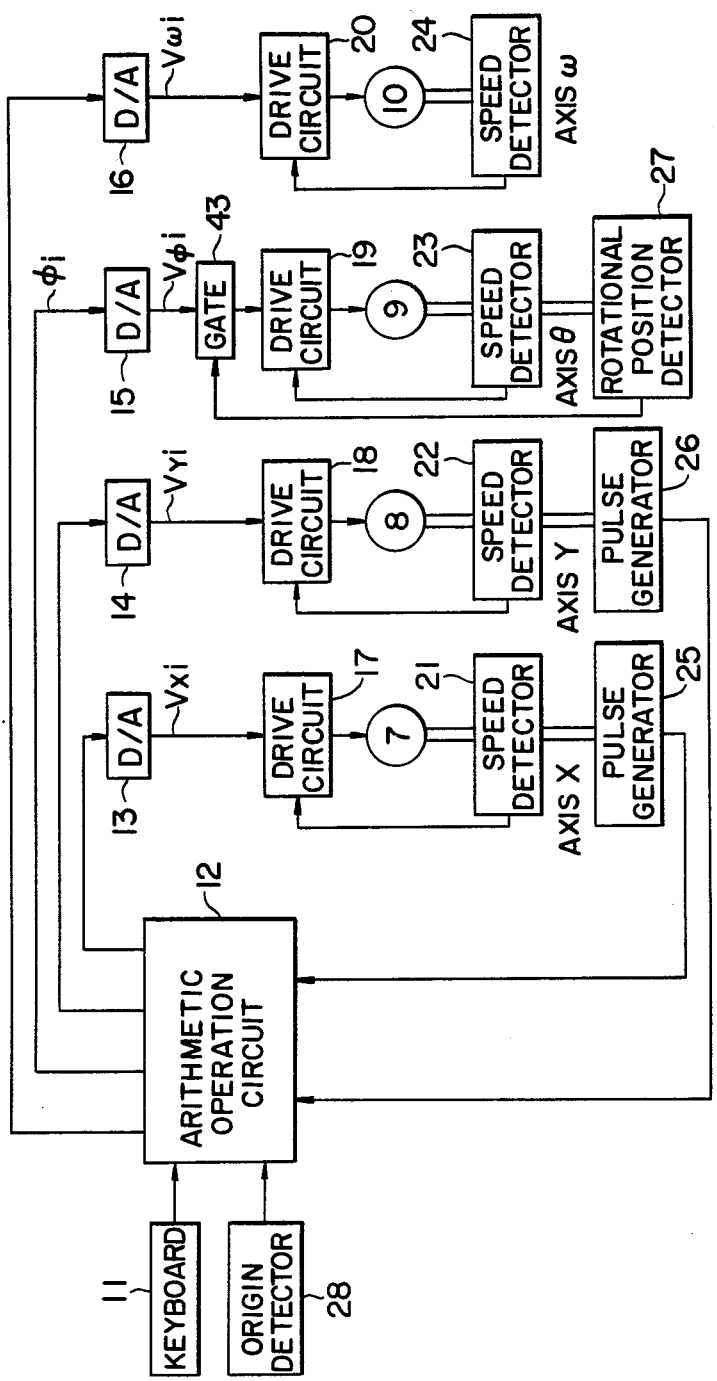
FIG. 3 is a block diagram showing the electrical connection of the control panel shown in FIG. 2.

The control circuit shown in FIG. 3 and contained in the control board 6 comprises an arithmetic operation circuit 12 in the form of a microcomputer, for example, and inputted with necessary data or operating parameters from the keyboard 11, digital/analogue converters 13–16 for converting digital control signals outputted from the arithmetic operation circuit 12 into analogue control signals and a gate circuit 43 in the form of a comparator or an OR gate circuit is connected before or after the digital/analogue converter 15. The outputs of the gate circuit 43 and digital analogue converters 13, 14, and 16 are supplied to drive circuits 17–20 of respective DC motors 7–10. Tachometer generators, rotary encoders or other speed detectors 21–24 which detect the speeds of respective motors 7–10 are coupled to these motors and the outputs of these speed detectors are applied to respective drive circuits. Pulse generators 25 and 26 are coupled directly to the DC motors 7 and 8 respectively and a rotational position detector 27 in the form of a potentiometer, for example, is coupled to the motor 9 for detecting the rotational position of the motor 9. The output of the rotational position detector 27 is fed back to the gate circuit 43, while the outputs of the pulse generators 25 and 26 are applied to the arithmetic operation circuit 12. The drive circuits 17–20 control start, stop and speeds of respective DC motors 7–10 in accordance with the signals fed back from the speed detectors 21–24, by using the analogue control signals from the digital analogue converters 13–16 as references. An origin detector 28 that detects the origin of the table 3 is provided and its output is supplied to the arithmetic operation circuit 12.

In operation, the data inputted from the keyboard 11 are processed by the arithmetic operation circuit 12 for producing control target values of respective axes as digital signals which are converted into analogue signals with respective digital/analogue converters 13–16 and then supplied to respective DC motors 7–10 via drive circuits 17–20 respectively. Except the motor 10 which is rotated in only one direction for wrapping the tape, the other three motors may be reversible, in which case the drive circuits 17, 18 and 19 may contain rotation reversing circuits. The purpose of the tachometer generators 21–24 is to control the motors 7–10 to rotate at the instructed speeds. Regarding axes X and Y, pulse generators 25 and 26 are coupled directly to motors 7 and 8 for producing pulses of the numbers corresponding to their number of revolutions. These output pulses are inputted to the arithmetic operation circuit 12 for calculating the distance run by counting the number of pulses by counters in the arithmetic operation unit or circuit 12. At this time, the operation of the microcomputer 12 is interrupted. The rotation angle of the axis $\theta$ is detected by the potentiometer 27 and its output is fed back to the gate circuit 43.

The origin detector 28 is positioned on the bed 2 at a central position corresponding to the center of the straight portion 1a of the coil 1 so as to set this position into the microcomputer.

Figure 1:
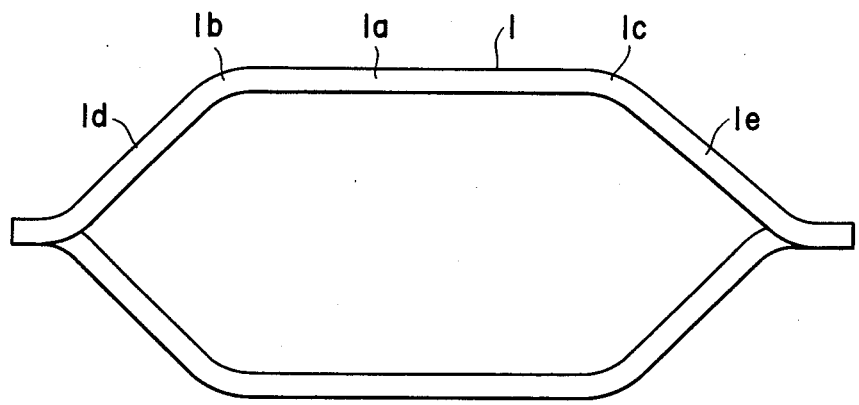
FIG. 1 is a plan view showing one example of an electric coil of a dynamoelectric machine to be wrapped with an insulating tape with the apparatus embodying the invention.

To wrap the tape about coil 1 having a configuration as shown in FIG. 1, the coil is mounted on the coil holders 5 as shown by dotted lines in FIG. 2 so as to position horizontally the straight portion 1a of one coil side to be wrapped with the tape with its center coincided with the origin detector 28. After the head 4 has passed through the origin it is brought to the starting point of the end portion 1d or 1e. The numbers of pulses generated by the pulse generators 25–27 during the movement of the head are counted to determine the X-Y coordinates of the origin.

Then the coil dimensions and wrapping instructions are inputted into the arithmetic operation circuit 12 with the keyboard 11 and stored in a memory device of the arithmetic operation circuit. Then, the coordinates (Xi,Yi) of the head corresponding to one reciprocation necessary to wrap the tape during both forward and return strokes, running speeds $V_{xi}$ and $V_{yi}$ of the axes X and Y, the rotational speed $V_{\phi i}$ and rotational angle $\phi_i$ of the axis $\theta$, and the rotational speed $V_{\omega i}$ of the axis $\omega$ are calculated for each section, and the calculated data are stored in the memory device.

After bonding one end of the insulating tape onto the surface of the coil, a start button, not shown, is depressed to start the wrapping operation. Once started, the wrapping operation is continued until an instructed number of layers are formed while automatically counting the number of reciprocations and then the wrapping operation is stopped automatically.

Figure 4:
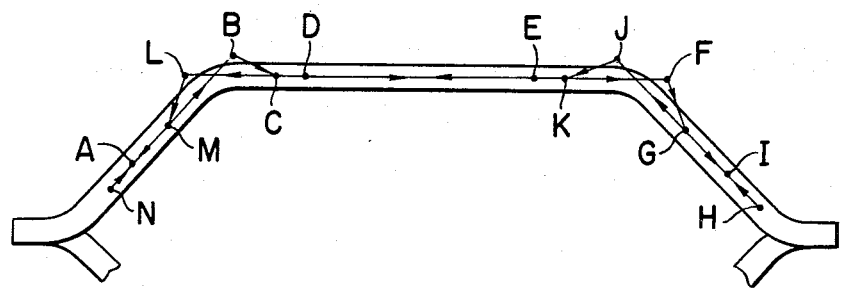
FIG. 4 is a diagrammatic representation showing the locus of the center point of the tape wrapping head utilized in the apparatus shown in FIG. 2.

When wrapping the tape in this manner, the position on the coil surface corresponding to the tape pay out position of a reel supported by the rotating ring on the head 4 should advance in the direction of wrapping by a distance Lr with respect to the position to which the tape end has been bonded and the distance Lr is maintained constant during the succeeding wrapping operation. This advance distance Lr is determined by such wrapping specifications as the half lap, $\frac{1}{3}$ lap and butt wrappings, the width of the insulating tape, the distance over which the tape wrapping point advances along the coil surface as the rotating ring rotates one revolution, the peripheral length of the coil including the thickness of already formed tape layers, and the distance between the center of the rotating ring and the tape pay out position from the rotating ring. In the calculation of the rectangular coordinates determining the position of the rotating ring, 14 points, for example, are set along one reciprocation, as shown in FIG. 4 by considering the advance distance Lr. FIG. 4 shows one example of the locus of the center of the rotating ring in which working sections at the curved portions 1b and 1c are determined such that these sections can be deemed substantially straight. The rotating ring is advanced in the order of A→B→C→D→E→F→G→H→I→J→K→E→D→L→M→N→A. Thus 16 sections are set. Since the movement in the direction of axis X covers all sections, this axis X is taken as a reference axis and the position of the head is judged by counting the number of pulses generated by the pulse generator 25 so as to determine a section being worked. Sections A-B, G-H, I-J, and M-N are end portions in which the head is moved not only in the direction of axis X but also in the direction of Y. Since the direction of movement of the head is reversed in sections H-I and A-N, the head is moved in the directions of axes X and Y while the rotating ring is stopped. In most cases, the advance distance Lr differs more than 1 mm in the forward and return strokes, so that the advance distance is calculated for both strokes and the stepped portions of the insulating layers are taken into consideration. In sections B-C, F-G, J-K and L-M corresponding to curved portions all electric elements regarding all axes X, Y, $\theta$ and $\omega$ are operated, but as the sections K-E and C-D at the straight portion are adjacent to the curved portions a control is made such that the head would not move in the direction of axis Y, thus eliminating an error caused by an offset in that direction. Since sections E-F and D-L are located immediately before the curved portions the head is run at a speed similar to that of the end portions. In section D-E or E-D, the head is run only in the direction of axis X and since this section is longest and easy to control, the head is run at the highest speed. In other sections, however, since the number of the controlled items increases, the head is run at a speed about $\frac{1}{3}$ of that in section D-E, thus permitting accurate calculation and control with an arithmetic operation circuit 12 having a low processing speed.

In the circuit shown in FIG. 3, the calculation is made for each reciprocation and the result of calculation is stored in the memory device so that the computer may have a small memory capacity and the calculation and processing speeds may be low. In each section, the speeds along various axes are calculated by taking the speed $V_{\omega i}$ about axis $\omega$ as a reference. In any section the speed of the head along respective axes is made constant thus eliminating any item that varies as a function of time.

Figure 5:
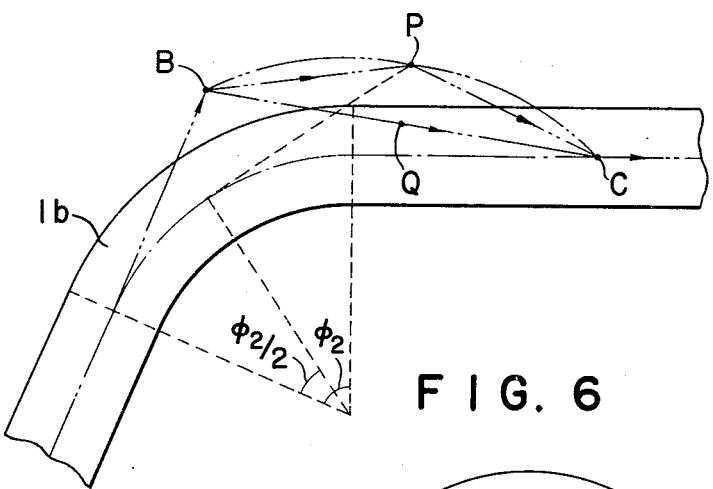
FIG. 5 is an enlarged plan view of the lefthand curved portion of the coil shown in FIG. 1.

Although the arithmetic operation circuit 12 outputs speed instructions to respective axes, the angles and the number of revolutions of the axes $\theta$ and $\omega$ (motors 9 and 10) are not fed back to the arithmetic calculation circuit 12 but instead necessary rotation angle $\phi$ shown in the enlarged view in FIG. 5 is inputted into the computer. As a consequence, as soon as the head enters into sections B-C, F-G, J-K and L-M respectively the head 4 begins to rotate about the axis $\theta$. When the fact that the potentiometer 27 has rotated by an angle $\phi$ is detected the gate circuit 43 stops the drive circuit 19, and hence the motor 9. Where the gate circuit 43 is constituted by a comparator, the motor 9 is stopped when the speed instruction outputted from the arithmetic operation circuit 12 and the output of the potentiometer 27 become equal. In addition, such rotating speed is instructed to axis $\theta$ that the rotating ring rotates over angle $\phi$ during an interval in which the head 4 runs from the starting point to the end point of the curved portion. Furthermore, the running distances of the head in the X and Y directions are fed back to the arithmetic operation circuit 12 so that it is possible to drive the motor 8 in synchronism with the motor 7 by correcting the speed of motor 8 while taking the axis X as a reference. Where a plurality of types of coils whose angles $\phi$ are nearly equal are considered, the rotating speed $V_{\phi i}$ about the axis $\theta$ is fixed and preset in the drive circuit 19 of the motor 9.

Figure 6:
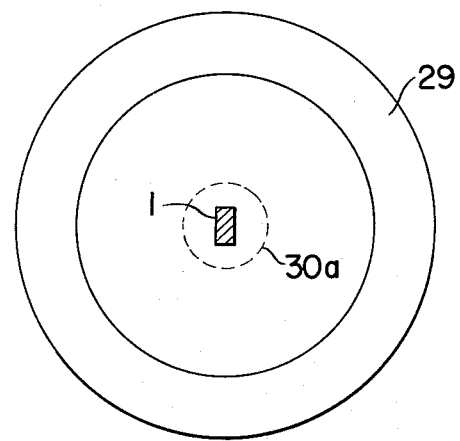
FIG. 6 is a diagram for explaining the displacement of a coil side during the wrapping operation.

Taking the section B-C (i=2) as an example, the wrapping operation of the curved portion 1b will now be described with reference to FIG. 5. Denoting the center portion of the rotating ring corresponding to an angle $\phi_1/2$ by P, satisfactory wrapping operation can be ensured if the point P were made to trace a loci B-P-C. To this end, however, both $V_{X2}$ and $V_{Y2}$ would contain terms $\sin(\phi_2 - V_{\phi 2}t)$ and $\cos(Y_2 - V_{\phi 2}t)$ which vary with time t (wherein a suffix 2 represents the section number of the section B-C) whereby it is necessary to calculate the speed while moving the head. For this reason, if the processing speed of the computer were low, the wrapping speed would become lower than that of the manual operation. However, by causing point P to trace a chord $\overline{BC}$, $V_{X2}$ becomes $(X_3-X_2)V_{\phi 2}/\phi_2$ and $V_{Y2}$ becomes $(Y_3-X_2)V_{\phi 2}/Y_2$. This means that the speeds in the direction of axes X and Y do not vary with time. In other words, it becomes possible to precalculate these values and store them in a memory device.

Where one side of the coil 1 is positioned at the center of a circle 29 (FIG. 6) along which the rotating ring revolves, even if the coil side move in the vertical or horizontal direction, so long as the movement is within a dotted line circle 30a having a radius equal to the height of the coil side, such movement does not affect the quality of the wrapped electric coil. Accordingly, even if the center position of the rotating ring offsets by the difference between the point P and the center point Q of the chord $\overline{BC}$, so long as this difference is smaller than the width of the coil, since the angle of the rotating ring is the same for both points P and Q, the tape can be wrapped at the same accuracy as that obtained when the head travels along curve B-P-C.

On the other hand, when the distance between points P and Q is larger than the width of the coil 1, the control is made such that the center of the rotating ring will pass through two straight locus $\overline{BP}$ and $\overline{PC}$ instead of along a curve B-P-C. Then, since the coordinates of the point P can be expressed by numerical equations not containing the function of time t, the coordinates for two straight lines can be calculated beforehand for a constant speed in the same manner as a single straight line. When the angle of rotation $\phi$ increases than a case shown in FIG. 5, the arc B-P-C may be divided into 3 or more approximately straight lines.

Instead of a hexagonal coil, the invention can also be applied to other forms of coils, for example rectangular, circular, etc. Although the motors were explained as DC motors, AC motors can also be used.

Figure 7:
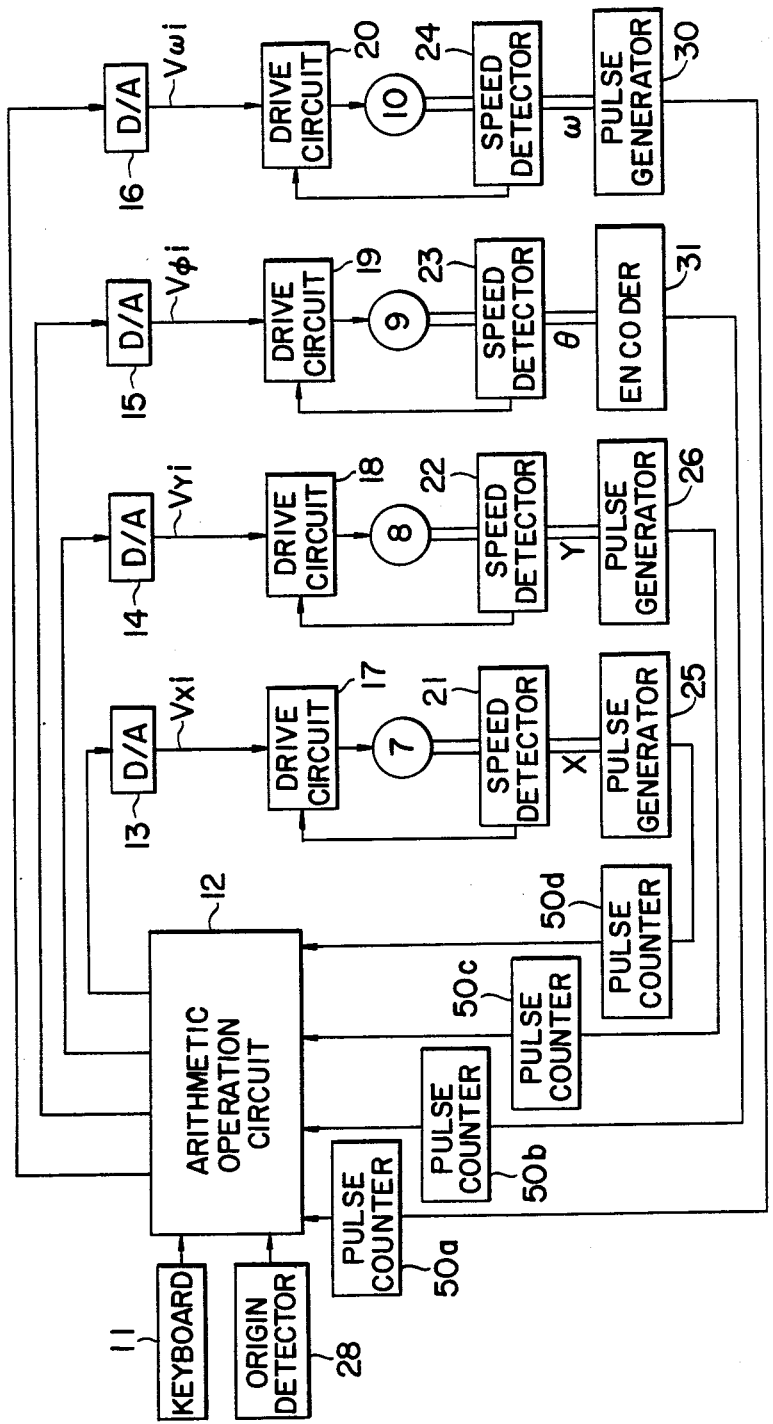
FIG. 7 is a block diagram showing a modification of the circuit shown in FIG. 3.

FIG. 7 shows another embodiment of this invention in which a driving device for rotating the rotating ring and a drive device for moving the head along the coil and for changing the angle of the axis of the ring are operated synchronously for improving the efficiency of the tape wrapping operation.

In FIG. 7, circuit elements idential to those shown in FIG. 3 are designated by the same reference numerals. In FIG. 7 gate circuit 43 shown in FIG. 3 is not used, a pulse generator 30 is coupled to motor 10, and a rotation angle measuring device 31 in the form of a rotary encoder is coupled to the motor 9 for producing a pulse proportional to the rotational angle of the motor 9. The pulses generated by pulse generators 25, 26, 30 and rotary encoder 31 are applied to counters 50a, 50b, 50d and 50c respectively. The counts of these counters are then supplied to the arithmetic operation circuit 12. Actually, however, these counters are included in the arithmetic operation circuit 12.

In operation, after mounting the coil 1 on the supports 5, the head 4 is moved to pass through the origin 28 to reset counters 5a–5d and to coincide the center of the rotating ring with the point A of the coil 1. Then the keyboard 11 is operated to input the size of the coil and the specification of the tape wrapping into the computer of the arithmetic operation circuit 12. Then the operation circuit 12 operates substantially in the same manner as above described except the following.

More particularly, the arithmetic operation circuit 12 compares the pulse generated by the pulse motor 30 driven by motor 10 with the pulses generated by the pulse generators 25 and 26 and the encoder 31 driven by other three motors 7, 8 and 9 so as to simultaneously correct the speed instruction signals for these three motors by taking the speed of the motor 10 as a reference. This enables to drive four motors 7–10 in synchronism.

The counting of the pulses generated by pulse generators 25, 26, 30 and encoder 31 by the counters 50a–50d may be made on the time division basis. In this case, the counting period of the pulses generated by pulse generator 30 is made to be shorter than those of the pulses generated by the pulse generators 25, 26 and the encoder 31, for example about 1/10. Then except for the sections H-I and N-A in which the direction of movement of the rotating ring on the head is reversed, all four motors can be driven synchronously.

Since the motor 7 for moving the head in the direction of axis X is driven throughout the wrapping operation, the position of the head 4 and hence the section along which the head is running can be identified by counting the number of pulses generated by the pulse generator 25 and the speed instructions for the four motors are renewed. Even when a given section is the same for the forward and return strokes, the advance distance Lr often differs for both strokes by more than 1 mm, so that it is advantageous to use different speed instructions for both strokes.

In sections H-I and N-A in which the direction of movement of the rotating ring on the head is reversed motors 7 and 8 rotate, but motors 9 and 10 do not rotate, so that it becomes impossible to compare the speed by taking the speed of motor 10 as a reference. Accordingly, in these sections the speed of motor 8 is controlled by taking the speed of the motor 9 as a reference.

With the control circuit shown in FIG. 7 the speeds of respective motors are controlled by local closed loops without using the arithmetic operation circuit 12 and only relative positional errors of respective axes are corrected by the time divisioned operation of the arithmetic operation circuit meaning that the four motors can be operated synchronously without increasing the burden of the arithmetic operation circuit 12. Where the speed instructions for motors 7, 8 and 9 are set by using the speed instruction for the motor 10, since the time divisioned positional controls do not contain any item varying as a function of time, time consuming troublesome calculations are not required, thus enabling an increase in the tape wrapping speed.

Since the degree of integration of circuit elements and the capacity of the memory device of a modern microcomputer have been greatly improved in recent years, where all data regarding desired number of layers are stored in addition to the speeds and coordinates regarding one reciprocation of the head the burden of the microcomputer would be limited to the control of the synchronous rotation of four motors and to the processing of judging the position of the rotating ring based on the distance run so as to issue speed instructions for a section in which the rotating ring presents. This makes it possible to increase the running speed of the head, and hence the wrapping speed.

I claim:

1. An automatic insulating tape wrapping apparatus for wrapping an insulating tape about an electric coil dividable into a plurality of sections and including a curved portion, comprising:
    a tape wrapping head including a rotating ring carrying said insulating tape;
    first drive means for rotating said head about said coil;
    second drive means for moving said head straight along said coil;
    third drive means for swinging said head about an axis perpendicular to a straight movement of said head;
    a plurality of speed detectors respectively driven by said first, second and third drive means for feeding back speed signals to said first, second and third drive means respectively, and
    arithmetic operation means for driving said second drive means at predetermined speeds in respective sections and for driving said third drive means for swinging said head at a predetermined speed and for a predtermined angle.

2. The apparatus according to claim 1 which further comprises fourth drive means for moving said head in a direction perpendicular to a direction of movement caused by said second drive means.

3. The apparatus according to claim 1 or 2 which further comprises a plurality of drive circuits connected between said arithmetic operation means and said drive means for controlling speeds thereof in accordance with speed instructions delivered by said arithmetic operation means.

4. The apparatus according to claim 2 wherein said second and fourth drive means are provided with pulse generators for producing pulses which are supplied to said arithmetic operation means.

5. The apparatus according to claim 1 which further comprises a gate circuit connected between said third drive means and said arithmetic operation means, and a rotational position detector driven by said third drive means for controlling said gate circuit.

6. The apparatus according to claim 2 which further comprises pulse generators respectively driven by said first to fourth drive means, and a plurality of counters respectively counting numbers of pulses generated by said pulse generators for modifying speed instructions delivered from said arithmetic calculating means to said first to fourth drive means.

7. The apparatus according to claim 2, which further comprises an additional speed detector driven by said fourth drive means for feeding back a speed signal to said fourth drive means.

* * * * *